United States Patent [19]

Geen et al.

[11] Patent Number: 4,762,415
[45] Date of Patent: Aug. 9, 1988

[54] MULTIPLE AXIS RING LASER GYROSCOPES

[75] Inventors: John A. Geen; David J. Guppy, both of Bracknell, England

[73] Assignee: British Aerospace Plc, London, England

[21] Appl. No.: 858,896

[22] Filed: Apr. 25, 1986

Related U.S. Application Data

[63] Continuation of Ser. No. 626,245, Jun. 29, 1984, abandoned.

[30] Foreign Application Priority Data

Jun. 29, 1983 [GB] United Kingdom ............... 8317598

[51] Int. Cl.[4] ........................................... G01C 19/64
[52] U.S. Cl. ................................................... 356/350
[58] Field of Search ......................................... 356/350

[56] References Cited

U.S. PATENT DOCUMENTS

| | | | |
|---|---|---|---|
| 4,397,027 | 8/1983 | Zampiello et al. | 356/350 |
| 4,407,583 | 10/1983 | Simms | 356/350 |
| 4,477,188 | 10/1984 | Stiles et al. | 356/350 |
| 4,585,346 | 4/1986 | Ljung | 356/350 |

FOREIGN PATENT DOCUMENTS 0040004 11/1981 European Pat. Off. .
2105098 3/1983 United Kingdom .

*Primary Examiner*—Vincent P. McGraw
*Assistant Examiner*—S. A. Turner
*Attorney, Agent, or Firm*—Cushman, Darby & Cushman

[57] ABSTRACT

In a multiple axis ring laser gyroscope in which one or more of the laser cavity corner mirrors is or are shared by different cavities and in which the laser beams in these different cavities operate at the same nominal frequency, scattering of the beam in one cavity into another cavity by the shared mirror(s) may produce disadvantageous lock-in effects. To at least lessen this possibility, the frequencies of the beams in the gyroscope disclosed herein are offset one from another, the offset being sufficient to affect lock in but not so great that the frequency of any beam is overly far from the lasing medium gain curve center. The frequency offsets may be produced by introducing offset bias signals into some channels of the gyroscope path length control servosystem.

11 Claims, 3 Drawing Sheets

MULTIPLE AXIS RING LASER GYROSCOPES

This is a continuation of application Ser. No. 626,245, filed June 29, 1984, now abandoned.

FIELD OF THE INVENTION

This invention relates to ring laser gyroscopes having a plurality of sensitive axes.

BACKGROUND OF THE INVENTION

Ring laser gyroscopes have one or more sensitive axes and for each axis there is provided a gas-filled cavity or ring disposed in a plane at right angles to the associated axis, each cavity comprising three or more linear, and usually equal, limbs. Around each cavity propagate two beams of light travelling in opposite directions and directed about a closed loop, by three or more mirrors located at the respective cavity corners, and regeneratively amplified at frequencies for which the path length equals an integral number of wavelengths. Amplification is achieved through a gas discharge within the cavity, at least one anode and one cathode being provided in each cavity.

The corner mirrors of laser gyroscope cavities are very expensive components since they have to have excellent optical characteristics. A single-axis ring laser gyroscope having a three corner cavity employs three mirrors, a two-axis, three-corner cavity ring laser gyroscope employs six mirrors and a three axis, three-corner cavity ring laser gyroscope employs nine mirrors and in each case, the mirrors constitute a significant proportion of the cost of the gyroscope.

Thus a gyroscope has been developed in which a reduced number of mirrors are used. Such an instrument is described in our U.K. Pat. No. 2,076,213 and can be defined as a ring laser gyroscope having a plurality of sensitive axes and hence a plurality of cavities, the cavities lying in different planes at right angles to the respective sensitive axes and each cavity having three or more corners arranged so that at least one corner coincides with a corner of another cavity, whereby the cavities are interconnected, the gyroscope further comprising a plurality of mirrors disposed respectively at the coinciding corners and the remaining corners of the cavities, whereby the number of mirrors at the coinciding cavity corners and the coinciding cavities being oriented such that the normal to each of these mirrors lies in the plane of each cavity it serves and bisects the associated corners of those cavities.

The present invention relates specifically to such an instrument.

As the individual cavities are interconnected, a common laser medium is used and hence the beams of the cavities all operate at the same nominal frequency. As in ring laser gyroscopes in general, the beams in each cavity are prone to back scatter from the mirror surfaces. This is a mutual scattering of energy which causes inter-action of the counter rotating beams within a cavity.

In multiple axis gyroscopes of the type described, there may be cross coupling of energy not only between the counter-rotating beams within an individual cavity but also between the beams of the several cavities as a result of the shared mirrors. This may cause gyroscope errors which are more severe than those occurring in single cavity gyroscopes because the cross coupling of energy between the beams of the different cavities is larger than the back scattering of light between the counter-rotating beams of a single cavity. Moreover, this has a knock-on effect since all the beams of the several cavities are affected by the beams of any one cavity.

SUMMARY OF THE INVENTION

An object of the present invention is to at least reduce the interaction of the beams of one cavity with the beams of another.

According to one aspect of the present invention, in a multiple axis ring laser gyroscope having a least one mirror shared by beams of different cavities and in which the frequencies of the beams in these different cavities are nominally the same, the frequencies of the beams in those different cavities are caused to be offset one from the other.

Since the cavities share the same laser medium, the beams of each cavity have identical gain centres, that is to say, when intensity is plotted against frequency the peak intensity occurs at a given frequency. Moreover, at or about peak intensity the intensity changes only relatively slowly with changes in frequency, thus frequency offsets can be effected from the gain center sufficient to ensure that interaction between the beams of the individual cavities is limited without materially effecting gain.

Where, as is usual, a path length control system is incorporated for the beams in each cavity to provide a constant path length for each beam and hence peak beam power, then it is convenient that the frequency offsets are effected by that system.

BRIEF DESCRIPTION OF THE DRAWING

A three-axis ring laser gyroscope incorporating the present invention will now be described by way of example, with reference to the accompanying drawings, in which.

DETAILED DESCRIPTION OF THE INVENTION

The actual body of the laser gyroscope is produced from a cube of dielectric material having a low coefficient of expansion, one such material being that known under the trade name Zerodur and which is a glass ceramic having an extremely low coefficient of expansion. This material is also transparent so that internal detail is clearly seen in FIG. 1.

Figure 1:
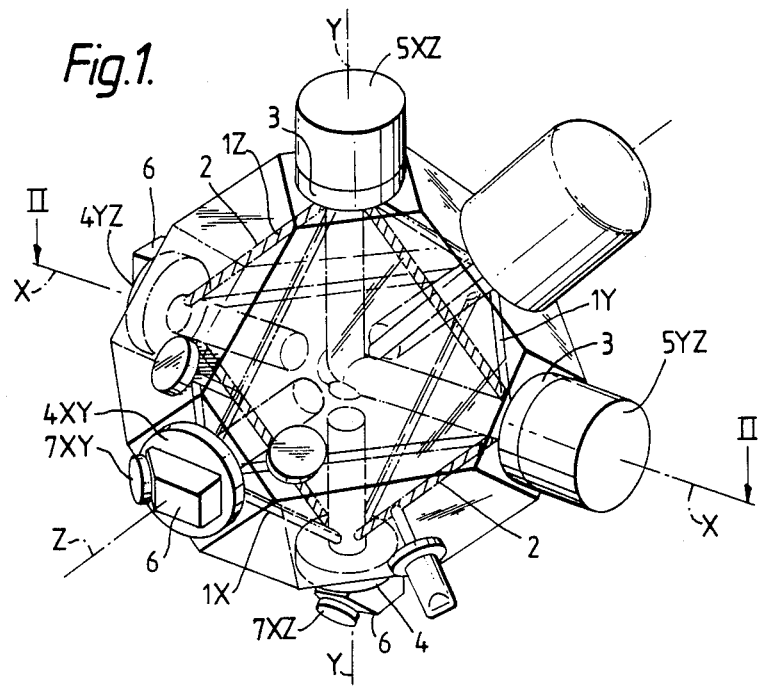
FIG. 1 is a diagrammatic perspective view of the gyroscope showing the internal detail.
Figure 2:
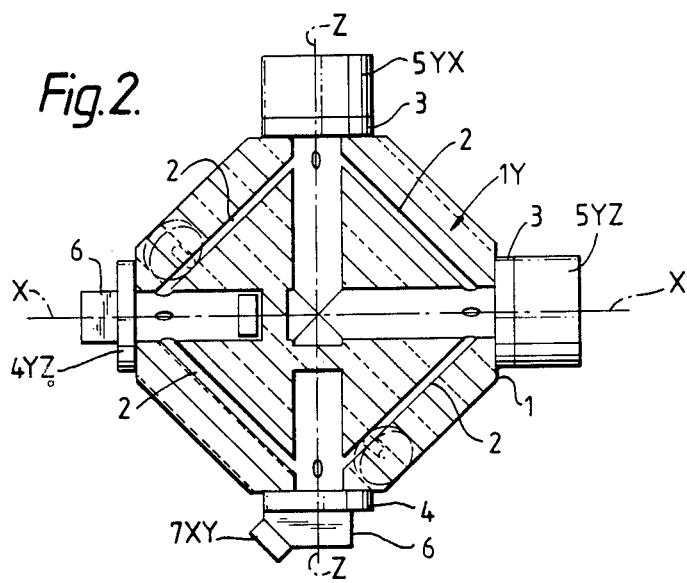
FIG. 2 is a section on the line II—II of FIG. 1.

Referring to FIGS. 1 and 2, three cavities (generally indicated at 1X, 1Y and 1Z in FIG. 1) are formed in the cube of material at right angles to respective axes X, Y and Z and each cavity is in the form of a square having four equal limbs 2 as seen in FIG. 2. For ease of identification, the cavity 1X has been shaded and the cavity 1Z cross hatched in FIG. 1. Thus, each cavity corner is common to two cavities, all three cavities 1X, 1Y and 1Z therefore being interconnected.

A mirror is provided at each corner of each cavity 1X, 1Y and 1Z, but as each corner of one cavity coincides with one corner of another cavity, there is a requirement for only six mirrors which is half the total number of cavity corners. More specifically, three path length control mirrors 3 are provided to serve the cavities 1Y, 1Z; 1X, 1Y; and 1X, 1Z respectively, and three output mirrors 4 are provided to serve the cavities 1Y, 1Z; 1X, 1Y; and 1X, 1Z; respectively. The mirrors 3 may be curved or plain and are preferably of the diaphragm type movable by a piezo-electric transducer 5 mounted adjacent the mirror in a housing to compensate for any change in path length of a cavity which may occur in operation of the gyroscope due to a number of well-known factors. For a given cavity 1X, 1Y and 1Z two of the three path length control mirrors 3 lie in the plane thereof and any adjustment is in the same sense as far as that cavity is concerned but the third mirror 3 not in the plane of that cavity will be adjusted in the opposite sense. Accordingly, path length control has to be effected by adjusting all three mirrors 3 simultaneously, this being achieved by an electronic circuit (shown diagrammatically in FIG. 3), which provides the signals for the piezo-electric transducers which in turn move the diaphragms of the mirrors 3.

The output mirrors 4 may also be curved or plain and each has a conventional combiner prism 6 attached thereto to provide fringes for a double element photodetector 7 associated therewith. The detectors 7 also provide feedback for path length control of the cavities 1X, 1Y and 1Z. While each mirror 4 serves two cavities 1X, 1Y and 1Z as indicated above, the combiner prism 6 is oriented so as to operate on the light bemas of one of the two associated cavities. For example, the combiner prism 6 seen in the eight o'clock position in FIG. 1 outputs the light beam from cavity 1Y and not cavity 1X which it also serves.

In the drawings, the components serving a given cavity are given an appropriate suffix. Thus, since each output mirror 4 serves two cavities, that serving cavities 1Y, 1Z is referenced 4YZ, that serving cavities 1X, 1Y is referenced 4XY; and that serving cavities 1X, 1Z is referenced 4XZ.

Figure 3:
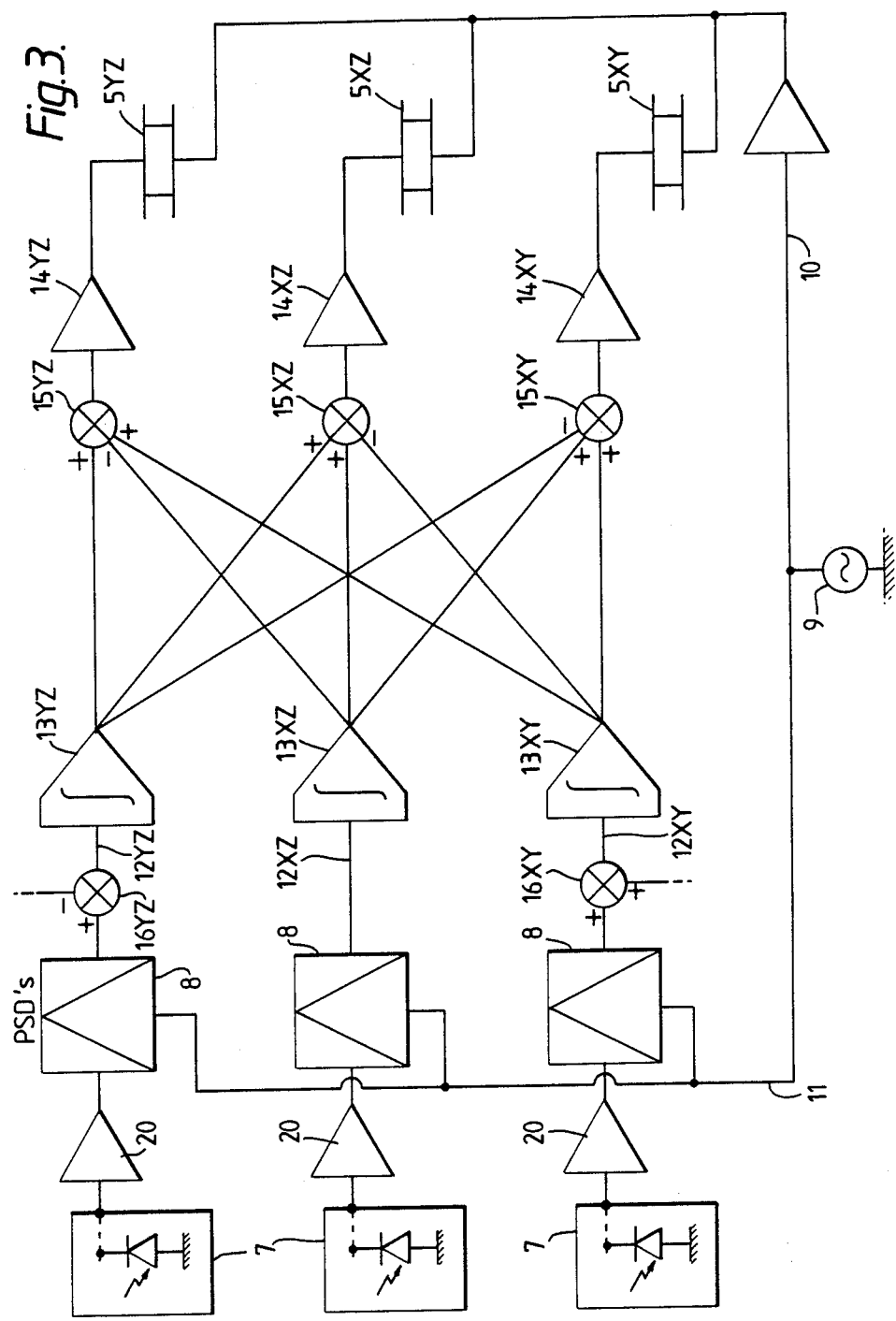
FIG. 3 is a diagram of a path length control system for the gyroscope of FIGS. 1 and 2.

Referring now to FIG. 3, as mentioned previously, the detectors 7 are used to provide fringe spacing indicative signals which are processed by suitable means (not shown) to become the output signals of the gyroscope and, in addition, there are derived from the detectors 7 signals indicative of the intensity or lasing gain of the beams in the respective cavities. These signals are fed via respective amplifiers 20 to respective ones of three phase sensitive detectors 8.

Each path length control mirror (not shown in FIG. 3) serves two cavities, that serving cavities 1Y, 1Z being referenced 3YZ and so on. Meanwhile, the piezo-electric transducers or mirror movers associated with the respective path length control mirrors are correspondingly referenced 5YZ, 5XZ and 5XY respectively.

A periodic perturbation, provided by a carrier frequency generator 9 is fed to the transducers 5 along line 10. This causes a fluctuation of the beam frequency and correspondingly a fluctuation in intensity of each beam. When the average cavity path length of each beam is such as to put the average beam frequency on the gain center, i.e. where the beam has maximum intensity, the fluctuation in intensity has a frequency equal to twice the frequency of the applied carrier frequency. When the average cavity path length is such as to put the average beam frequency off the gain center, i.e. at something less than maximum intensity, the fluctuation in intensity will include a component at a frequency equal to that of the carrier frequency.

The carrier frequency from generator 9 is also applied along line 11 to the phase sensitive detectors 8 and, when any of these detectors detects a component in the intensity signal from the associated detector 7 at the same frequency as the carrier frequency, it produces an error signal directly related to the difference between the average beam frequency and the gain curve center frequency. This error signal is fed along the appropriate one of lines 12YZ, 12XZ and 12XY to accordingly change cavity path length, by a servo arrangement including integrators 13YZ, 13XZ and 13XY, high voltage amplifiers 14YZ, 14XZ and 14XY and then to transducers 5YZ, 5XZ and 5XY, to change the beam path length of each cavity to bring the frequency back to the gain center.

Since the mirror 3 associated with any one of the transducers 5YZ, 5XZ, 5XY is associated with two cavities, any mirror movement must be in the same sense, i.e. to shorten or lengthen as far as the cavity being adjusted is concerned, but in the opposite sense as far as the third mirror is concerned. Accordingly, path length control has to be effected by adjusting all three mirrors 3 simultaneously. This is achieved by passing the output from each integrator additionally to the two other high voltage amplifiers by way of summing devices 15YZ, 15XZ and 15XY. Thus, the output from integrator 13YZ is passed not only to summing device 15YZ (where it is positively summed) but also to summing devices 15XZ (where it is positively summed), and 15XY (where it is negatively summed).

The outputs from integrators 13XZ and 13XY are treated similarly, as illustrated diagrammatically in FIG. 3, the combined effect being to null any displacement of frequency of the beams in all three cavities from the gain center. To provide the frequency offset to prevent or reduce the cross coupling previously discussed, an artificial error is introduced in the servo control. Since the illustrated embodiment is a three-cavity gyroscope, only the frequency of those beams associated with two of the cavities require to be offset, one to each side of the gain center of the third.

As shown in FIG. 3, this is achieved by placing a summing device 16YZ in the line 12YZ and a summing device 16XY in the line 12XY, that referenced 16YZ having a negative voltage corresponding to a desired offset, whilst that referenced 16XY has a positive voltage. The servo mechanism then tends to produce an error signal from each detector 7 which compensates for the artificially introduced offset error and thus gives a corresponding offset in the path length of the beams of each cavity corresponding to suitably different frequencies.

In the present example, a frequency offset of plus or minus a few tens of mega Hertz from the gain center is found to be ample to overcome any output rate locking but is suitably small compared with the typically one giga Hertz mode spacing of the laser medium.

Figure 4:
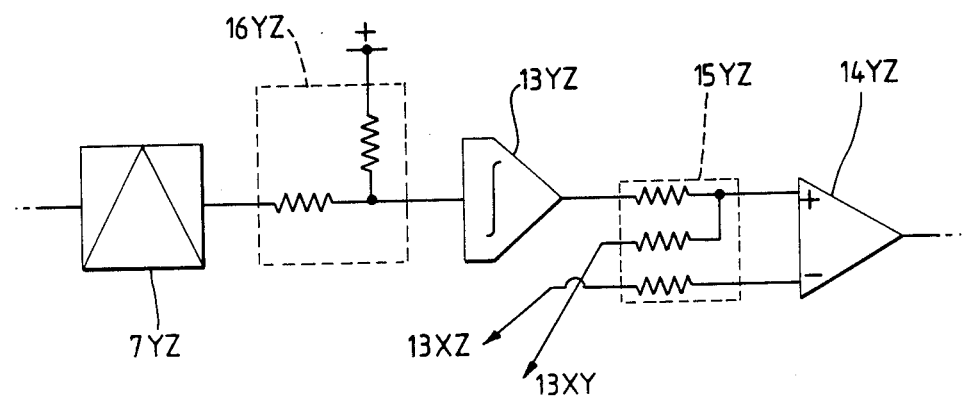
FIG. 4 is a diagram of part of the FIG. 3 system illustrating respective implementations of two summing junctions used in the system.

As shown in FIG. 4, the summing device 16YZ of FIG. 3 could take the form of a simple resistor connected in series between the phase sensitive detector 7YZ and the input of the integrator 13YZ, along with a further resistor connected between the integrator input and a positive supply voltage source, for example the positive supply rail used for powering the integrator. The summing device 16XY could take a similar form except that here the further resistor is connected to a negative supply voltage source, for example the negative supply rail for the integrator.

Also as shown in FIG. 4, each of the summing devices 15YZ, 15XZ and 15XY could take the form of three resistors connected between the outputs of respective ones of the integrators and either the inverting or non-inverting input of the appropriate amplifier 14. Thus, for the YZ channel shown in FIG. 4, the resistors from integrators 13YZ and 13XY are each connected to the non-inverting input of amplifier 14YZ to provide an additive summation while the resistor from integrator 13XZ is connected to the inverting input of the amplifier to give a subtractive summation.

We claim:

1. A multiple axis ring laser gyroscope comprising:
   at least one mirror shared by beams of a plurality of cavities;
   a laser medium shared by the plurality of cavities which therefore have the same natural frequency; and
   offsetting means arranged so that the mean frequency of the beam in each one of the plurality of cavities is offset from the mean frequency of the beams in at least one other of the plurality of cavities and for reducing the cross-coupling effect between the beams of any two of the plurality of cavities;
   said offset frequency amount being sufficient to avoid the cross-coupling effect between the beams of any two of the plurality of cavities in order to avoid rate locking, but the offset frequency amount being small relative to the mode spacing in each one of the plurality of cavities.

2. A gyroscope according to claim 1 in which the mean frequency of the beams in each one of the plurality of cavities is offset from the mean frequency of the beams in at least one other of the plurality of cavities on the order of tens of megahertz.

3. A gyroscope according to claim 1 comprising a frequency offsetting component associated with all but one of the plurality of cavities.

4. A gyroscope according to claim 1 including path length control means operable for controlling respective beam path lengths in each one of the plurality of cavities, the path length control means being further operable to maintain a relationship between said respective beam path lengths, which produces the offsetting of the respective beam frequencies in the plurality of cavities.

5. A gyroscope according to claim 4 wherein said path length control means comprises servo-means which is operable to sense respective gain signals indicative of laser beam gains within each one of the plurality of cavities and to derive from the gain signals respective servo signals for controlling the path lengths within each one of the plurality of cavities to maintain the laser beam gains at substantially the same value, the path length control means further including offset signal applying means arranged for affecting the servo signals so as to maintain the laser beam gains at respective different positions within said range.

6. A gyroscope according to claim 5, wherein said servo means comprises perturbation means for producing a periodic variation in the beam path length in each one of the plurality of cavities, sensing means for supplying respective intensity signals indicative of the laser beam intensities in the plurality of cavities, phase-sensitive detector means connected to said perturbation means and said sensing means and operable for supplying output signals indicative of components of the respective intensity signals at the frequency of said periodic beam path length variation, integrating means for receiving the output signals from the phase sensitive detector means and for integrating said output signals to produce respective path length control signals for each one of the plurality of cavities, and offset biasing means for applying offset signals to the integrating means to produce said offsetting of the laser beam frequencies.

7. A gyroscope according to claim 1, the gyroscope comprising:
   six mirrors positioned at the corners of a notional octahedron and defining between them three planar four-sided optical cavities which are orthogonal to one another, three of the six mirrors being coupled to respective displacing devices operable for responding to received displacement control signals to displace the respective three mirrors along their respective optical axes;
   sensor means for supplying respective intensity signals indicative of the laser beam intensities within said cavities;
   perturbation signal generating means connected to said displacing devices and operable for generating a periodic perturbation signal which produces an oscillatory movement of each of the three mirrors;
   three phase sensitive detectors each connected to receive said perturbation signal and a respective one of said intensity signals, and each operable to produce a signal indicative of any component of the associated intensity signal of which the frequency equals that of the perturbation signal;
   three integrators connected to receive and integrate the respective output signals from each one of the phase-sensitive detectors;
   offset signal supply means connected to apply to the inputs of two of the integrators respective different offset signals; and
   three summing devices for combining the outputs of said integrators to form respective control signals for controlling said displacement devices.

8. A multiple axis ring laser gyroscope comprising:
   at least one mirror shared by beams of a plurality of cavities;
   a laser medium shared by the plurality of cavities which therefore have the same natural frequency;
   offsetting means arranged so that the mean frequency of the beam in each one of the plurality of cavities is offset from the mean frequency of the beams in at least one other of the plurality of cavities and for reducing the cross-coupling effect between the beams of any two of the plurality of cavities; and
   path length control means operable for controlling respective beam path lengths in each one of the plurality of cavities, the path length control means being further operable to maintain a relationship between said respective beam path lengths, which produces the offsetting of the respective beam frequencies in the plurality of cavities.

9. A gyroscope according to claim 8 wherein said path length control means comprises servo-means which is operable to sense respective gain signals indicative of laser beam gains within each one of the plurality of cavities and to derive from the gain signals respective servo signals for controlling the path lengths within each one of the plurality of cavities to maintain the laser beam gains at substantially the same value, the path length control means further including offset signal applying means arranged for affecting the servo signals so as to maintain the laser beam gains at respective different positions within said range.

10. A gyroscope according to claim 9, wherein said servo means comprises perturbation means for producing a periodic variation in the beam path length in each one of the plurality of cavities, sensing means for supplying respective intensity signals indicative of the laser beam intensitites in the plurality of cavities, phase-sensitive detector means connected to said perturbation means and said sensing means and operable for supplying output signals indicative of components of the respective intensity signals at the frequency of said periodic beam path length variation, integrating means for receiving the output signals from the phase sensitive detector means and for integrating said output signals to produce respective path length control signals for each one of the plurality of cavities, and offset biassing means for applying offset signals to the integrating means to produce said offsetting of the laser beam frequencies.

11. A multiple axis ring laser gyroscope comprising:
at least one mirror shared by beams of a plurality of cavities;
a laser medium shared by the plurality of cavities which therefore have the same natural frequency;
offsetting means arranged so that the mean frequency of the beam in each one of the plurality of cavities is offset from the mean frequency of the beams in at least one other of the plurality of cavities and for reducing the cross-coupling effect between the beams of any two of the plurality of cavities;
six mirrors positioned at the corners of a notional octahedron and defining between them three planar four-sided optical cavities which are orthogonal to one another, three of the six mirrors being coupled to respective displacing devices operable for responding to received displacement control signals to displace the respective three mirrors along their respective optical axes;
sensor means for supplying respective intensity signals indicative of the laser beam intensities within the plurality of cavities;
perturbation signal generating means connected to said displacing devices and operable for generating a periodic perturbation signal which produces an oscillatory movement of each of the three mirrors;
three phase sensitive detectors were connected to receive said perturbation signal and a respective one of said intensity signals, and each operable to produce a signal indicative of any component of the associated intensity signal of which the frequency equals that of the perturbation signal;
three integrators connected to receive and integrate the respective output signals from each one of the phase-sensitive detectors;
offset signal supply means connected to apply to the inputs of two of the integrators respective different offset signals; and
three summing devices for combining the outputs of said integrators to form respective control signals for controlling said displacement devices.

* * * * *